Nov. 23, 1954

R. G. HANDLEY 2,694,931

DEEP BIN GRAIN PROBE

Filed May 9, 1952

INVENTOR
*Richard G. Handley*

BY *W. V. McDowell*

ATTORNEY

United States Patent Office 2,694,931
Patented Nov. 23, 1954

2,694,931
DEEP BIN GRAIN PROBE

Richard G. Handley, Columbus, Ohio

Application May 9, 1952, Serial No. 287,072

4 Claims. (Cl. 73—425.2)

The present invention relates generally to measuring devices, and more specifically to an improved measuring probe and sampling device adapted for insertion within a body of comminuted solids, such as grain, housed within a bin or elevator for determining the depth of the grain and for obtaining test samples of the grain at varying levels within the associated receptacle.

In the past, straight, elongated rods or probing devices have been used to measure the depth of grain positioned within a bin or grain elevator, and generally such rods or probing devices constituted a substantially rigid and elongated pole-like member which was forcibly inserted or driven into a body of grain from the upper level thereof to measure the depth of the grain above a division or bottom wall member positioned within the bin or elevator. It oftentimes occurs that there is restricted head room or clearance between the upper level of the body of grain and the superstructure or roof portion of a bin or elevator in which the grain is housed, and as a result, it is, therefore, difficult, if not impossible, to use an elongated and straight rod-like probe where the length of the probe exceeds the distance between the upper level of grain and the ceiling or roof of the associated storage receptacle. Also, with the ordinary type of grain probe, there is no provision made for sampling grain at various levels within a bin or elevator to determine the quality or type of grain at a given level within the bin or elevator to which visual reference may not be had.

It follows, therefore, that the primary object of the present invention is to provide an improved grain probe and sampling device adapted for use in relatively deep bins or elevators, and one which not only functions to measure the depth of grain within a housing structure, but also extracts a relatively small quantity or sample of grain disposed at various levels throughout the depth of the associated housing.

It is another object of the invention to provide a grain probe which is comprised of a flexible string of relatively short but rigid tubular sections permitting the probe to be used in bins or elevators having a relatively small vertical clearance between the upper level of the grain and the roof or ceiling structure of the housing for the body of grain, and wherein the individual tubular sections may be detachably connected in longitudinal alignment to permit the same to be inserted as a unit within a body of grain.

A further object of the present invention is to provide a grain probe of this character which comprises a multiplicity of flexibly united straight sections arranged to be selectively interlocked with one another to provide a substantially elongated, rigid pole or rod-like member which may be inserted in a truly vertical plane within a bin or elevator, and wherein, upon withdrawal of the probe, the separate sections thereof are disengaged from their initially interlocked positions and held to one another by flexible linkage to permit the separate sections, upon withdrawal, to be moved angularly relative to one another and laterally with respect to the bin or elevator structure, thereby enabling the probe to be withdrawn from a relatively extreme depth without striking the roof or ceiling structure of the associated bin or elevator.

Yet another object of the invention is to provide a grain probe of this character wherein the separate sections are provided with hollow chambers adapted to be opened upon initial withdrawal of the probe from a body of grain to admit a sample of grain at various levels throughout the depth of the bin or elevator.

For a further and more detailed understanding of the present invention and the various additional objects and advantages realized therefrom, reference is made to the following description and the accompanying drawing, wherein:

Fig. 3 is an enlarged fragmentary longitudinal vertical sectional view taken through two adjacent sections of the probe and showing the details of the flexible connection between.

Figure 1:
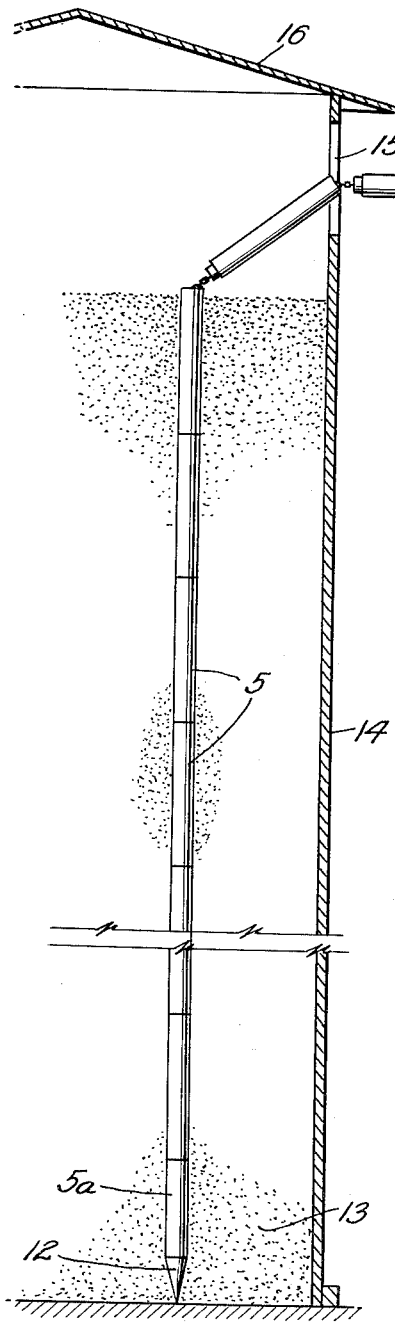
Fig. 1 is a side elevational view of my improved deep bin grain probe showing the separate sections thereof in their connected positions for downward insertion within a body of grain.
Figure 2:
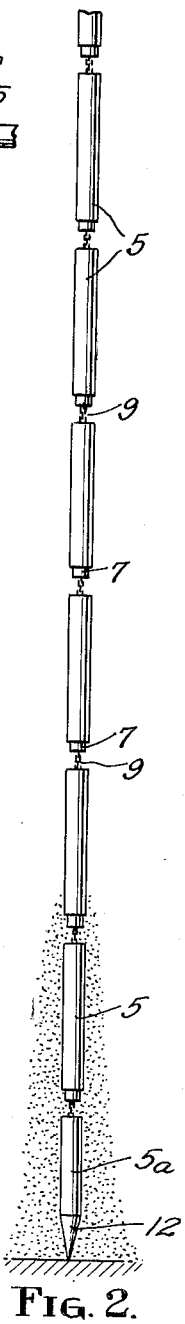
Fig. 2 is a similar view showing the separate sections of the probe in their extended, flexibly united positions upon withdrawal of the probe from a body of grain.
Figure 3:
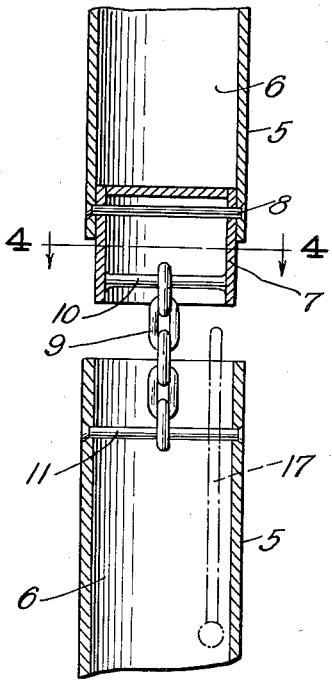
Figure 4:
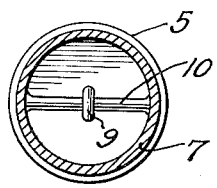
Fig. 4 is a detailed horizontal sectional view taken along the line 4—4 of Fig. 3.

Referring now to the drawing, it will be seen that my improved grain probe and sampling device comprises a string of straight cylindrical casing sections 5 which are formed to provide internal sample-receiving chambers 6 which open at the upper ends of the casing sections 5, as viewed in Figs. 1–3 of the drawings. The lower ends of the chambers 6 are closed by means of a relatively reduced diameter plug-like extension 7, whose outer diameter corresponds closely to the inner diameter of the individual sections 5, and which is rigidly secured in the lower end of the sections 5 as, for example, by means of a transversely extending rivet or locking pin 8. It will also be understood that any suitable locking means may be employed for rigidly securing the plug-like extension or projection 7 within the individual casing sections 5, and toward this end, the projection 7 may be welded or press-fitted within the lower ends of the sections 5. The plug-like projections 7 extend longitudinally outwardly from the lower ends of the individual sections 5 and are arranged for removable insertion within the upper open end of a next adjacent casing section 5.

The individual casing sections 5 are united by means of flexible connectors, such as chains 9, and as shown particularly in Fig. 3 of the drawing, the outer or upper link of the chain 9 is carried upon a transversely extending pin 10 carried in the outer end portion of the plug-like projection 7. The lower end of the chain 9 is secured to a second transversely extending pin or rivet member 11 which extends diametrically through the upper end portion of the next adjacent casing section 5. The flexible chains 9 are arranged to permit interfitting insertion of the plug-like projections 7 within the open ends of a next adjacent casing section 5, while at the same time permitting the individual sections 5 to be relatively disengaged, as shown in Figs. 2 and 3, wherein the individual sections may be moved laterally with respect to one another and the individual sample-receiving chambers 6 opened at their upper ends to receive a sample of grain or the like.

As shown in Figs. 1 and 2, the lowermost casing section 5a may advantageously terminate in a pointed extremity 12 to facilitate forcible insertion of the probe within a body of grain 13 or other comminuted solids contained within a storage bin or grain elevator 14.

In operation, when it is desired to determine the depth of the body of grain 13 and to obtain samples of such grain at various levels within the bin or elevator 14, the individual casing sections 5, starting with the pointed or lowermost section 5a, may be introduced laterally or horizontally through an access opening 15 provided in the upper level of the elevator 14 in the manner of a chain, and as the sections are inserted vertically downwardly into the body of grain 13, the plug-like extensions or projections 7 of the individual casing sections 5 are initially inserted within the upper open ends of the next adjacent casing sections to close the internal chambers 6 thereof and to rigidly unite the casing sections 5 to provide a straight, elongated, unitary probe device. Due to the flexible connections between the individual casing sections, it is unnecessary to provide a relatively large amount of head room between the upper level of the grain and the roof or ceiling 16 of the bin or elevator, as the individual sections are of relatively short length as compared with the over-all length of the probe obtained upon insertion of the plug extensions 7 within the openings of the next adjacent sections. Thus, assuming that the length of the individual casing sections 5 is approximately one foot, ordinarily from two to three of the sections may be joined in longitudinal alignment by insertion of the plug projections 7 and forcibly thrust into the body of grain 13, whereupon succeeding casing sections 5 may be inserted into the next adjacent sections until the desired length of probe is obtained, and until the bottom level of the bin or grain elevator is reached. At this time, the operator of the probe may determine the depth of grain in the elevator by determining the number and length of the individual casing sections 5, and if desired, the individual casing sections may be provided upon their outer surfaces with suitable measuring scales or calibrations continuing upwardly from the pointed extremity of the lower casing section 5a, whereby as the lowermost casing section 5a reaches the bottom of the elevator or bin, the upper level of grain may be read directly in terms of its depth upon the calibrations carried upon the outer surfaces of the casing sections 5. It will be understood, however, that if the individual casing sections 5 are of uniform length, the depth measurement of the grain may be obtained merely by counting the number of casing sections inserted within the body of grain at the time the lowermost section contacts the bottom wall of the bin or elevator.

As seen in Fig. 1, the individual casing sections 5 are maintained in longitudinally aligned order with the plug-like projections 7 inserted within the open upper ends of the next adjacent casing sections by means of the resistance offered to the insertion of the individual casing sections by the body of grain. Thus, the sample-receiving chambers 6 are maintained in a closed condition during insertion of the probe device within the body of grain. When it is desired to withdraw the probe from the grain, and to obtain samples of grain at varying levels throughout the mass, the uppermost or exposed casing section 5 is pulled upon vertically, whereupon the successive casing sections 5 will be pulled relatively apart within the limits imposed by the chains 9 to remove the plug-like projections 7 and to open the upper ends of the sample-receiving chambers 6, whereupon a portion of the grain disposed at the varying levels of the upper end portions of the casing sections 5 will be admitted by gravitational flow within a sample-receiving chamber 6, and as the string of casing sections 5 is withdrawn from the body of grain 13, the individual chambers 6 may be emptied into testing receptacles in order that the quality and type of grain disposed at the varying levels may be determined.

Also, as illustrated in Fig. 3, the temperature of the grain at various levels may be determined by inserting a thermometer 17 within the individual sample-receiving chambers 6 of the separate casing sections 5 prior to insertion of the probe device within the body of grain 13.

In view of the foregoing, it will be seen that the present invention provides a mechanically efficient, yet structurally simple, grain probe and sampling device which is characterized by its ease of operation and flexibility, permitting the same to be used in storage bins or grain elevators having limited clearance between the upper level of a body of grain and the ceiling or roof structure of the bin or elevator. Further, in providing the interlocking or interfitting male and female connections between the individual casing sections, the device may be selectively arranged as an elongated and rigid unit, or as a string of flexibly united individual casing sections. Also, due to the flexible connections between the individual casing sections, the same are permitted to be relatively pulled apart upon withdrawal of the probe from the body of grain to admit samples of grain disposed at varying levels throughout the mass of granular material disposed within the elevator or bin, thus making it possible to determine the quality and type, as well as the amount, of comminuted solids disposed at various levels throughout the receptacle.

While I have disclosed what I feel to be a preferred embodiment of the invention, it will be understood that various modifications as to details of construction and design may be resorted to without departing from the spirit of the invention or the scope of the following claims.

I claim:

1. A sectional probe for effecting depth measurements of columnar beds of grain or the like contained in confining elevator structures, comprising a plurality of relatively separable rigid-walled tubular sections, each of said sections being formed to include an internal chamber which is open at the upper end of the section in which it is formed; a stationary rigid extension member positioned in and closing the bottom of each section and the chamber formed therein, the extension member of each section possessing a smaller diameter than the body portion of the section in which said chamber is formed, the smaller diameter of said extension member being such as to enable the same to be removably and telescopically fitted into the open upper end of the chamber formed in a next lower section, whereby to close the chamber and impart longitudinal rigidity to the probe when all the sections thereof are so interfitted, and permitting the probe to be moved vertically downwardly through a columnar grain bed; and a flexible connection uniting the extension member of each section with the open upper end portion of a next adjacent lower section, said flexible connections serving to admit of relative separation of said sections as the latter are being lifted and withdrawn from a grain bed into which the same were inserted, such separation being limited to an extent sufficient to open the upper ends of said chambers by the removal of the extension members therefrom, thereby enabling the chamber in each section to receive samples of the grain from the various depths of the grain bed penetrated by the probe.

2. A sectional probe for measuring the depths of elevator stored grain as defined in claim 1, and wherein the lower end of the tubular body of each section provides an annular shoulder adapted for seating engagement with the upper circular edge of a next adjacent lower section to limit positively the extent of telescoping movement of the extension member of the upper section into the open upper end of the chamber of the lower section.

3. A grain depth measuring probe having the structural characteristics of the probe defined in claim 1, wherein the length of each of said sections equals the length of each of the remaining sections.

4. A measuring probe of the character defined in claim 1, and wherein the flexible connections for uniting the extension members of said sections with adjacent upper ends of adjoining sections comprise lengths of flexible link chains which are adapted to be confined in said chambers when said sections are disposed in interfitting order.

References Cited in the file of this patent

UNITED STATES PATENTS

| Number | Name | Date |
|---|---|---|
| 855,849 | Gray | June 4, 1907 |
| 1,120,567 | Trommer | Dec. 8, 1914 |
| 1,168,486 | Des Isles | Jan. 18, 1916 |

FOREIGN PATENTS

| Number | Country | Date |
|---|---|---|
| 24,964 | Great Britain | 1899 |
| 296,823 | Germany | Mar. 6, 1917 |